Figure 6:
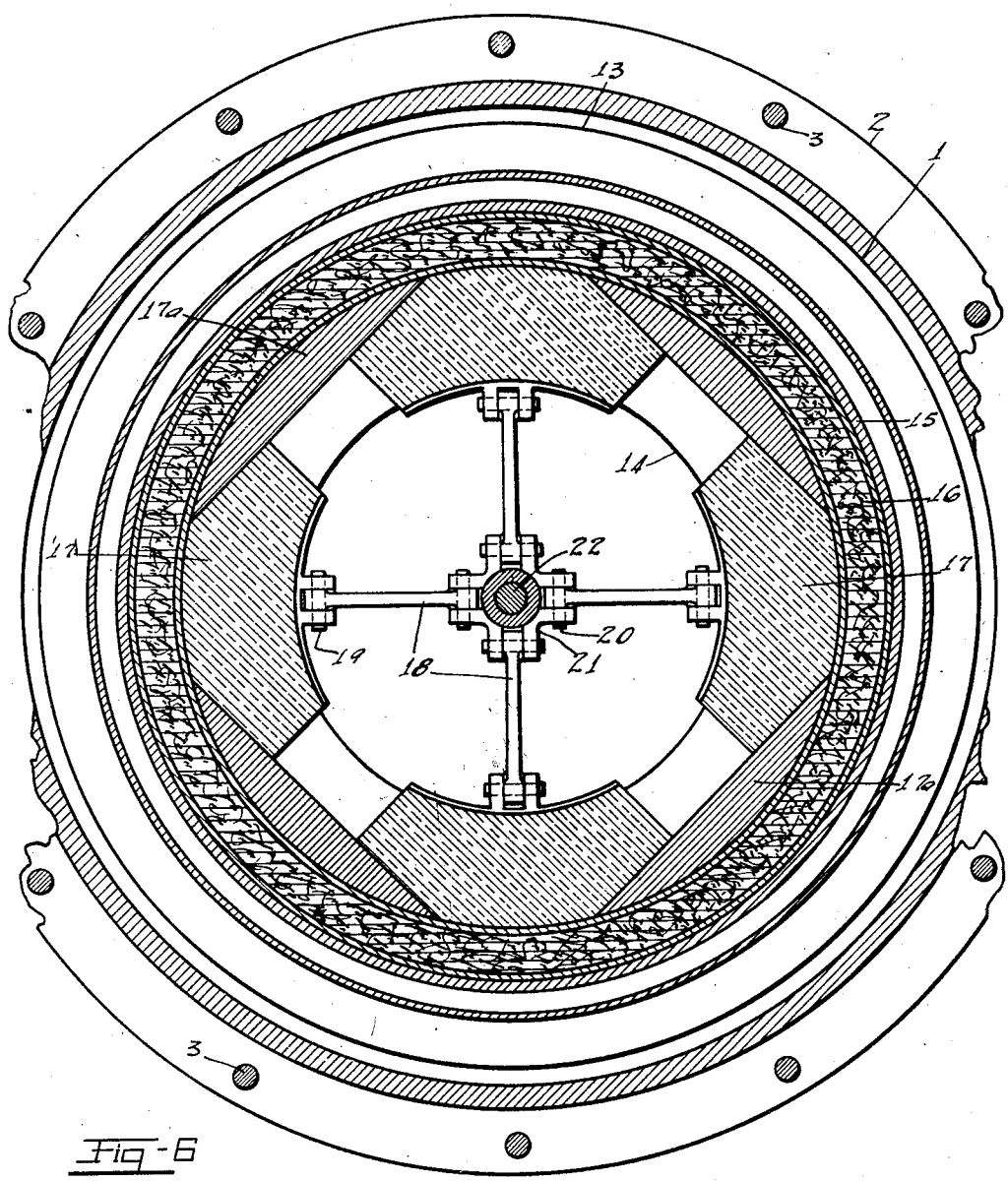

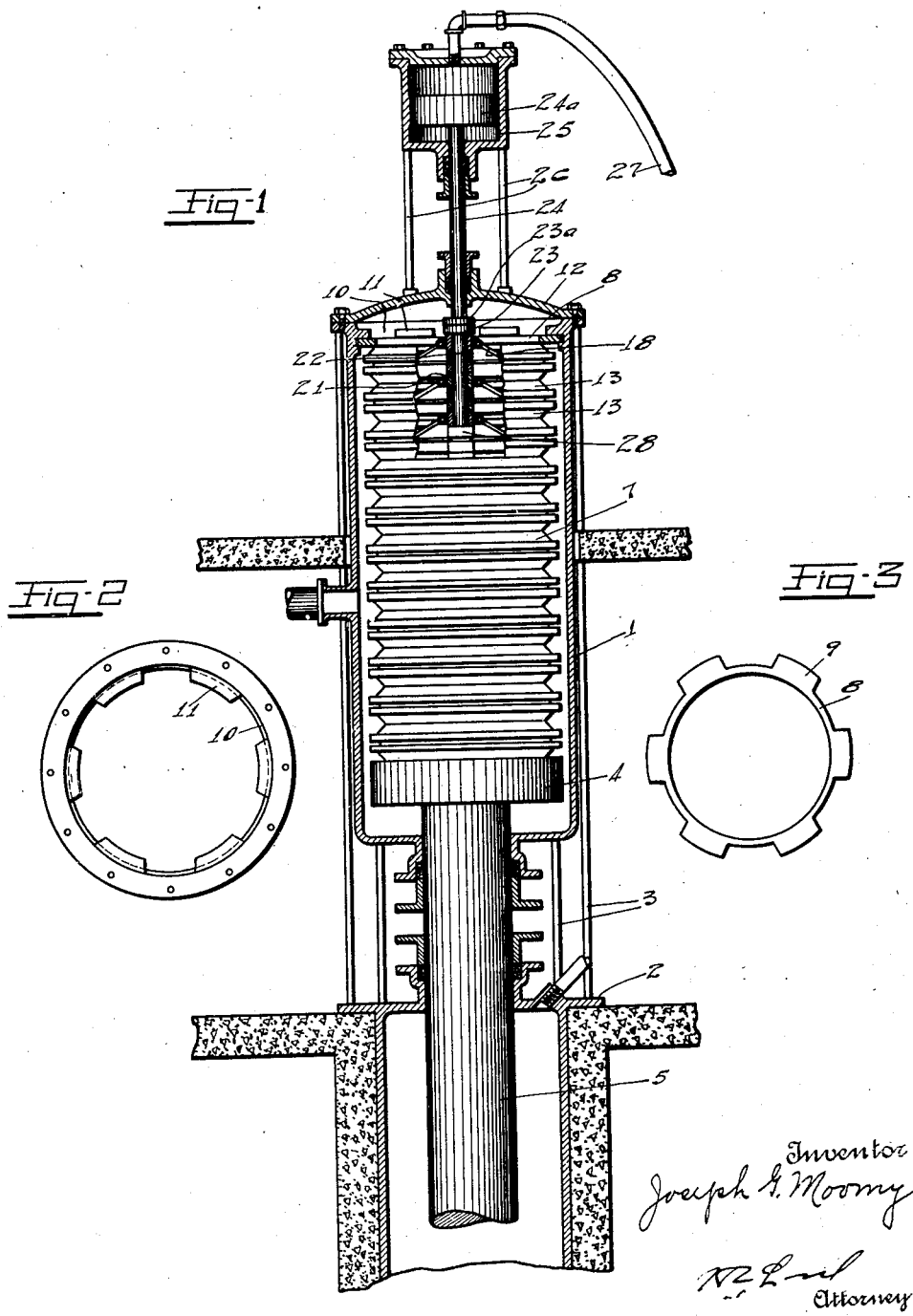

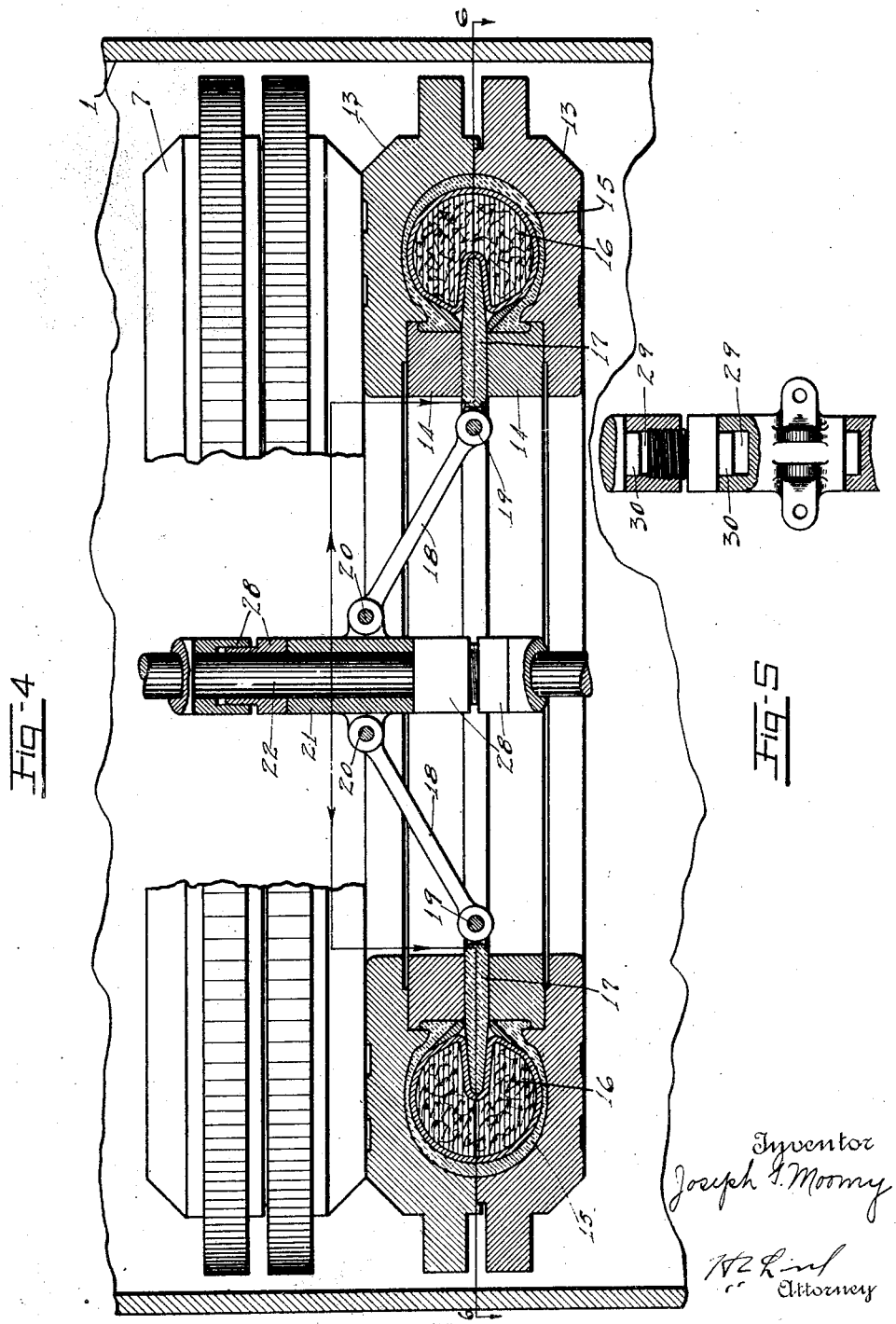

Patented Nov. 22, 1927.

1,649,843

UNITED STATES PATENT OFFICE.

JOSEPH G. MOOMY, OF ERIE, PENNSYLVANIA.

TIRE-MOLDING APPARATUS.

Application filed April 10, 1922. Serial No. 550,973.

This invention is designed to mold tires. Such tires are commonly molded in stacks in a vulcanizing chamber, the stack of molds being subjected to pressure from a plunger. Different methods of subjecting the tire during vulcanization to pressure have been used, one of the common methods being to inflate an expansible core with fluid pressure, usually air pressure. Where there is any leakage or reduction in this pressure from any cause the tires in the process of vulcanization are spoiled or injured. With the present invention an expansible core is used but the expansion is brought about mechanically. Another feature of the invention is the manner of securing the molds so that they may be observed under pressure prior to closing the chamber. Other details of the invention will appear from the specification and claims.

The invention is illustrated in the accompanying drawings as follows:—

Fig. 1 shows a central vertical section through a vulcanizing apparatus.

Fig. 2 a plan view of the chamber with the cover removed.

Fig. 3 a plan view of a retaining shoulder.

Fig. 4 an enlarged sectional view of the mold with the core expanded devices.

Fig. 5 a section of an alternative construction of spreading device.

Fig. 6 a section on the line 6—6 in Fig. 4.

1 marks the vulcanizing chamber, 2 a base in which the chamber is mounted, 3 posts extending from the base and carrying the chamber, 4 the platform in the chamber, and 5 a plunger by which the platform is raised as the tires are placed in the chamber and which exerts pressure on the stack during the vulcanizing.

A stack of molds 7 are shown on the platform. The top mold engages a removable shoulder 8 in the form of a ring having projections 9, the projections being adapted to pass through openings 10 between shoulders 11 extending from a wall of the chamber. The ring 8 after having the projections 9 passed through the openings 10 is turned so as to bring the shoulders 9 under the shoulders 11 thus forming an abutment for the molds against which they are compressed prior to placing the cover 12.

The mold is made up of the sections 13—13 carrying the pattern for the tread and side portions of the tire. The mold is completed by the rings 14 which form the base. These molds are closed through the pressure of the ram. A tire 15 is shown in section and an expansible core 16 is arranged within the mold. This core is preferably formed of sponge rubber or may be formed of sand or other material which will expand through displacement. Expanders 17 in the form of segments operate between the rings 14 and against the core 16. The segments are spaced apart so as to give clearance to permit the retracting of the segments and fillers 17$^a$ are placed in the core in position to be spread or forced outwardly by the segments so that when the segments are fully spread the parts are in the form of a ring. These segments are spread through the action of the toggle links 18 which are secured to the segments by pins 19 and to heads 21 by pins 20. A bar 22 is passed through the heads 21 so as to center them and is provided at its top with a shoulder 23 which is engaged by a shoulder 23$^a$ on a plunger 24 extending from a piston 24$^a$. The piston 24$^a$ operates in a cylinder 25 and the cylinder is mounted on posts 26 extending from the cover 12. Liquid or fluid is delivered through a pipe 27 to the cylinder and puts the heads 21 under pressure and the heads 21 operate through the toggles and expander ring displacing the core and putting the tire under pressure. This pressure follows up the softening action of the rubber so that as the vulcanizing proceeds and the plastic rubber yields the core exerts a following pressure. I prefer to provide adjusting thimbles 28 on the heads 21 so that they may be utilized for different sizes of tires.

The rod or bar 22 may be omitted if desired in which instance the heads are provided with sockets 29 and the projections 30 so that one head will be centered with another.

What I claim as new is:—

1. In a tire molding apparatus, the combination of a vulcanizing chamber; a platform therein; a series of tire molds arranged on the platform; cores in the molds; expanders acting on the cores; spreaders acting on the expanders comprising toggle levers and heads to which the toggle levers are secured; means for exerting pressure on the heads in unison; and centering devices for the heads.

2. In a tire molding apparatus, the combination of a vulcanizing chamber; a platform therein; a series of tire molds arranged on the platform; cores in the molds; expanders acting on the cores; spreaders acting on the expanders comprising toggle levers and heads to which the toggle levers are secured; means for exerting pressure on the heads in unison; and centering devices for the heads comprising a bar extending through the heads.

In testimony whereof I have hereunto set my hand.

JOSEPH G. MOOMY.